(12) United States Patent
Minari

(10) Patent No.: US 8,009,142 B2
(45) Date of Patent: Aug. 30, 2011

(54) VIRTUAL KEYBOARD SYSTEM AND CONTROL METHOD THEREOF

(75) Inventor: Makoto Minari, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 715 days.

(21) Appl. No.: 11/456,453

(22) Filed: Jul. 10, 2006

(65) Prior Publication Data

US 2007/0013673 A1 Jan. 18, 2007

(30) Foreign Application Priority Data

Jul. 12, 2005 (JP) .................................. 2005-203534

(51) Int. Cl.
*G06F 3/02* (2006.01)
*G06F 3/041* (2006.01)
*G09G 5/00* (2006.01)

(52) U.S. Cl. ....................................... 345/168; 345/173

(58) Field of Classification Search .................. 345/156, 345/168–178; 178/18.01, 18.03
See application file for complete search history.

(56) References Cited

U.S. PATENT DOCUMENTS 5,936,614 A * 8/1999 An et al. ........................ 345/173

FOREIGN PATENT DOCUMENTS

| JP | 03-041334 | 4/1991 |
| JP | 07-325887 | 12/1995 |
| JP | 11-327767 | 11/1999 |
| JP | 2003-186614 | 7/2003 |

* cited by examiner

*Primary Examiner* — Srilakshmi K Kumar
(74) *Attorney, Agent, or Firm* — Fitzpatrick, Cella, Harper & Scinto

(57) ABSTRACT

In a device that uses a virtual keyboard, an input field and a virtual keyboard used upon data input to that field are registered in association with each other. Upon data input, the associated virtual keyboard is used. When no associated virtual keyboard is available, a virtual keyboard of the system is used.

14 Claims, 19 Drawing Sheets

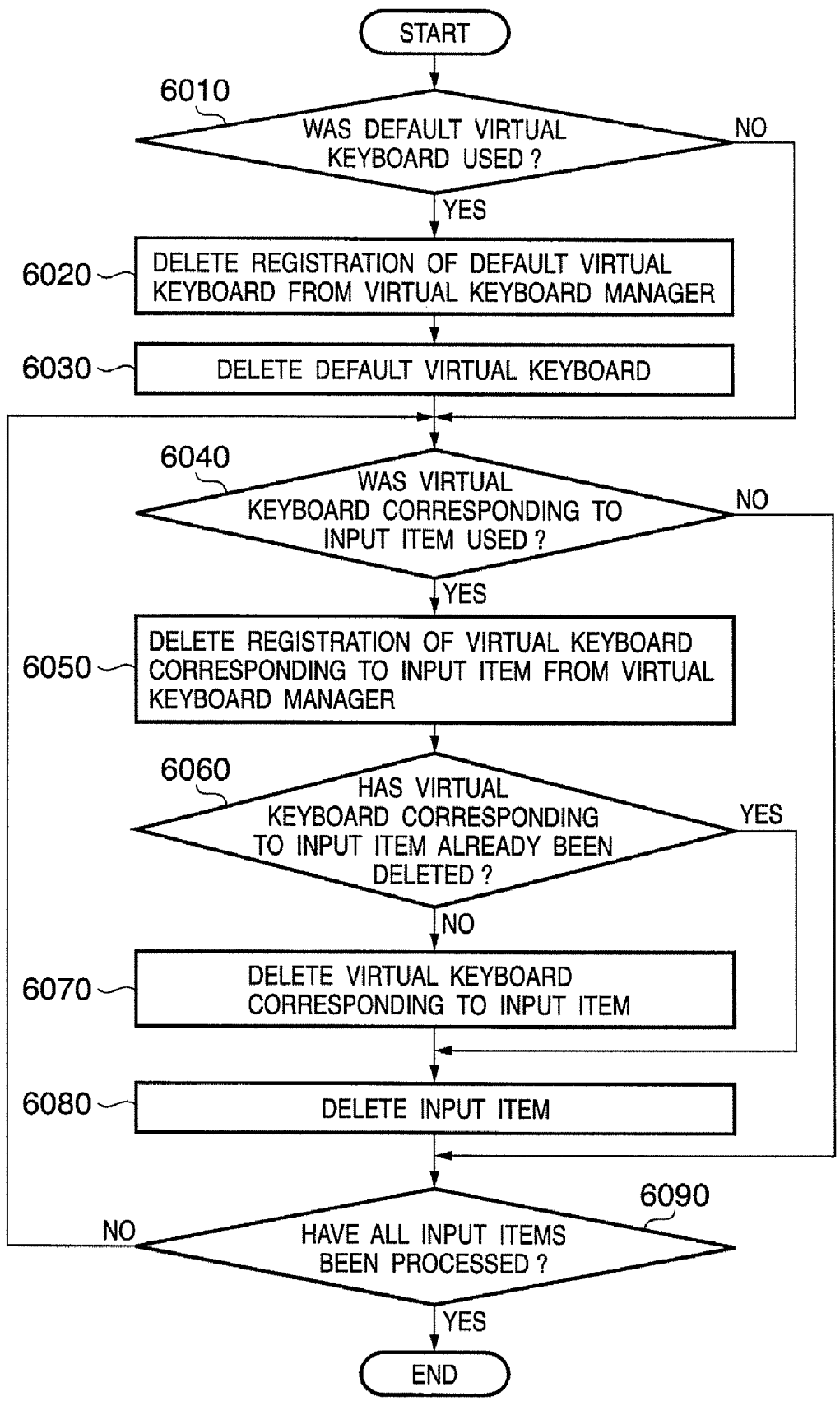

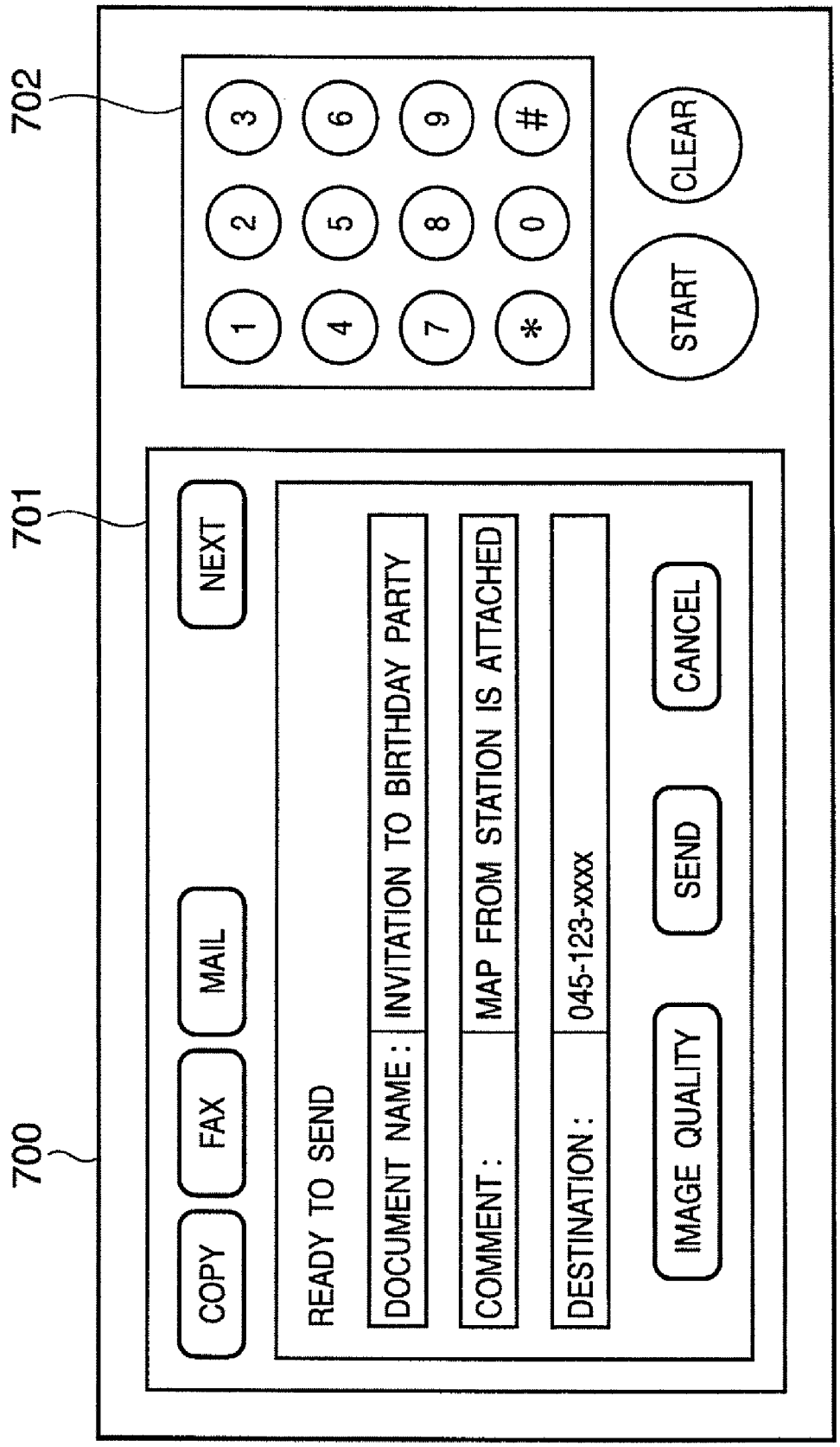

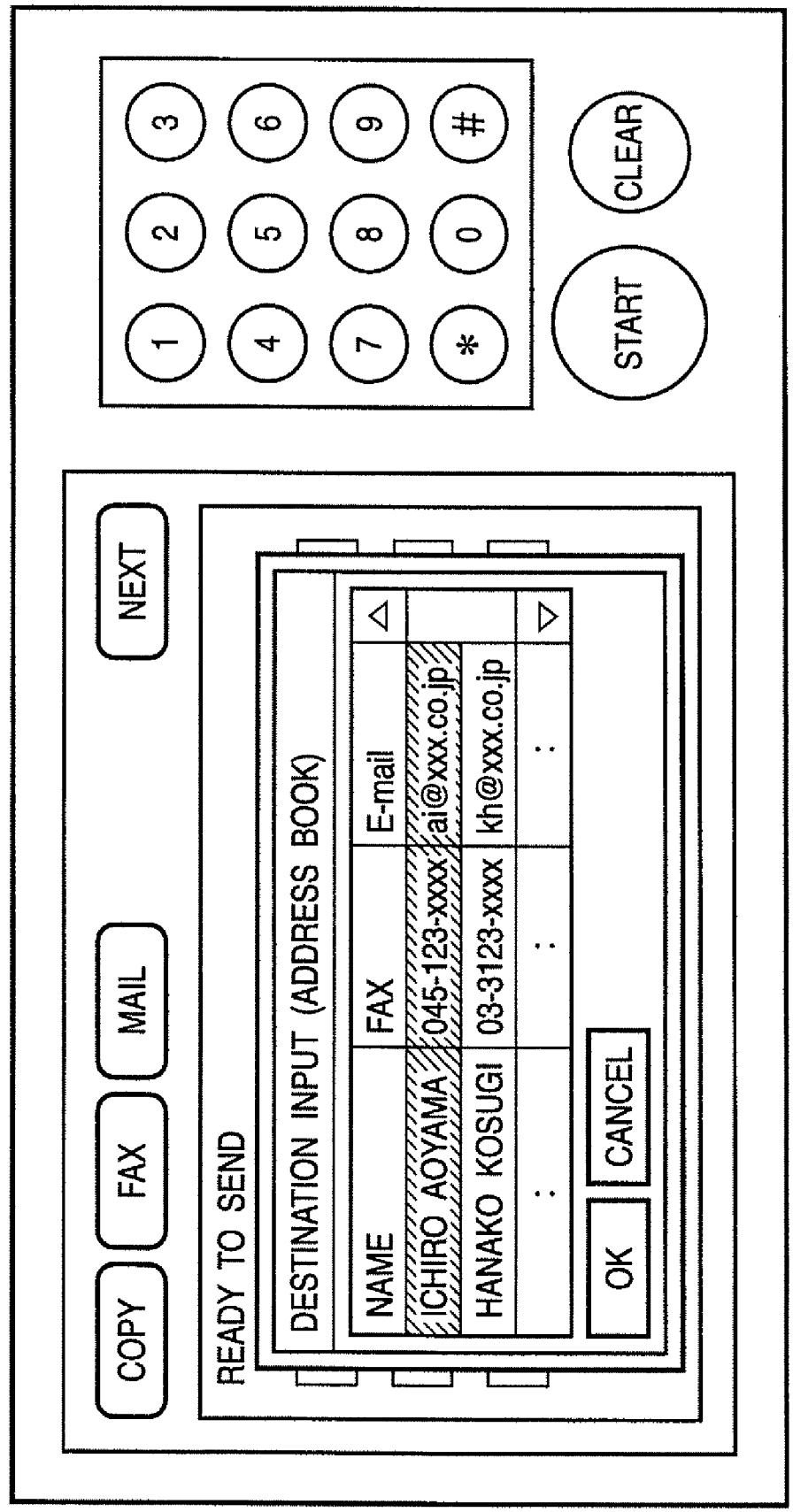

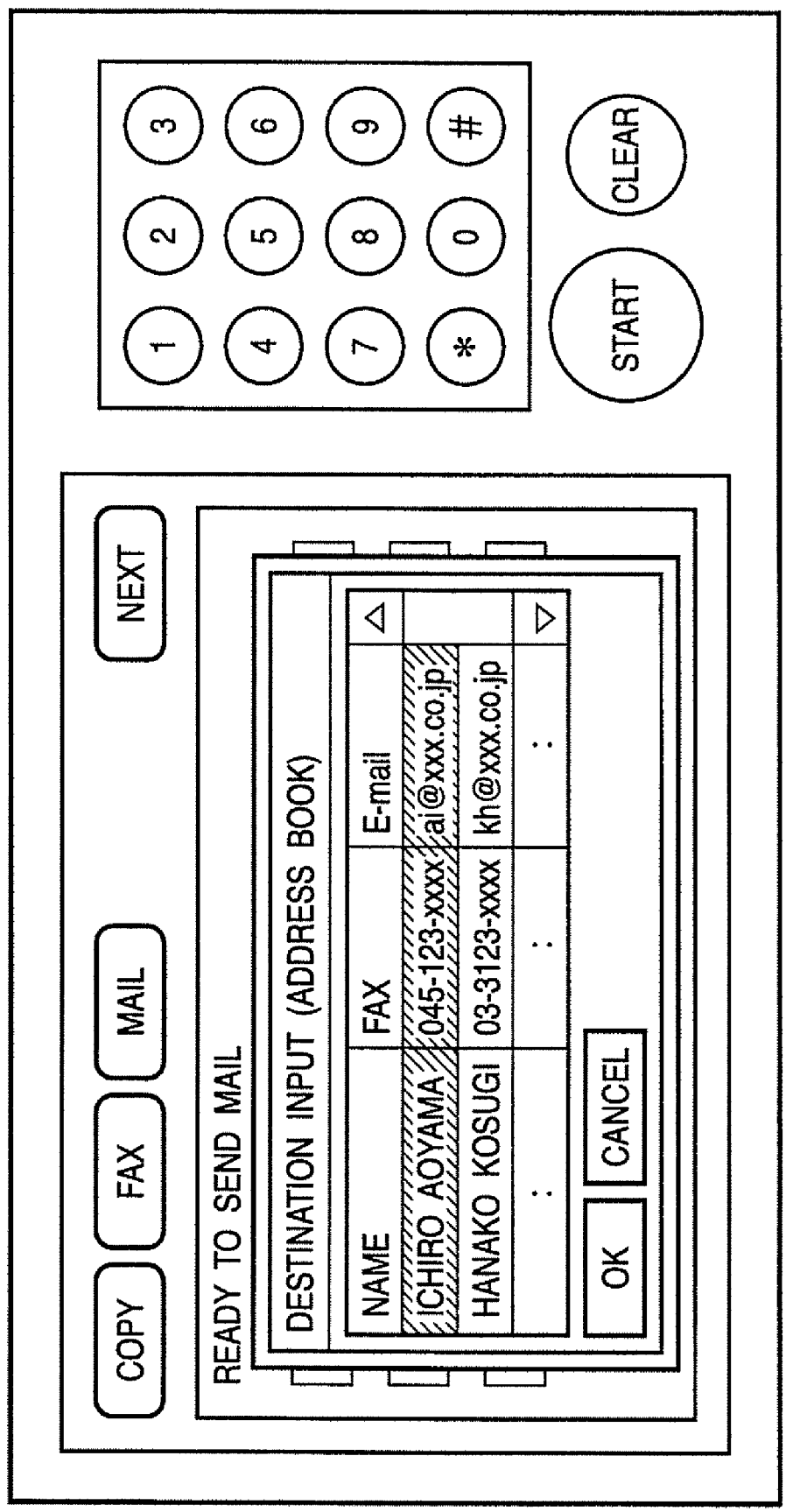

FIG. 14A

COPY   FAX   MAIL                NEXT

READY TO SEND

| DOCUMENT NAME: | INVITATION TO BIRTHDAY PARTY |
| COMMENT: | MAP FROM STATION IS ATTACHED |
| DESTINATION: | 045-123-xxxx |

IMAGE QUALITY    SEND    CANCEL

VIRTUAL KEYBOARD SYSTEM AND CONTROL METHOD THEREOF

BACKGROUND OF THE INVENTION

1. Field of the Invention

The present invention relates to a virtual keyboard system of embedded equipment such as a copying machine, facsimile apparatus, multi function peripheral equipment, and the like and, more particularly, to a virtual keyboard system and the like, which can register different virtual keyboards for respective input items and can input data.

2. Description of the Related Art

Embedded equipment, such as a copying machine, facsimile apparatus, multifunction peripheral equipment, and the like, have increasing gained advanced functions and high performance. As the number of application programs which run on the embedded equipment increases, the use application of the embedded equipment becomes diversified, and easy-to-operate environments that meet the needs of individual users are demanded.

Conventionally, in embedded equipment having no hardware keyboard, a virtual keyboard (also often called a software keyboard) that imitates the hardware keyboard is implemented. In a situation that requires data input, a virtual keyboard is displayed on a display device of the equipment, and the user can input data via that virtual keyboard.

In the data input using the virtual keyboard, when the user inputs, e.g., a name, he or she must switch an input mode of the virtual keyboard to a text input mode. Alternatively, when the user inputs an amount of money, he or she must switch the input mode to a numeric input mode. However, such operations are troublesome for the user.

Japanese Patent Laid-Open No. 07-325887 discloses, as a solution to the above problem, a technique in which the equipment automatically switches the input mode in accordance with the attribute of an input item and then allows the user to input data. According to this prior art, since the virtual keyboard prepared in advance is used, operations for input items with the same attribute and operations among application programs on the equipment are unified. However, the virtual keyboard cannot be switched for respective input items or application programs, or cannot be switched in correspondence with the user.

Japanese Patent Laid-Open No. 2003-186614 discloses a technique in which the equipment automatically switches display of a virtual keyboard to a different one in accordance with the attribute of an input item, and then allows the user to input data. However, with this prior art, one virtual keyboard can only be associated with an input item. Therefore, for example, it is impossible simultaneously to display a virtual keyboard exclusively provided to the input item and a numeric input virtual keyboard (numeric keypad) and to input data from both the virtual keyboards.

As described above, in the prior art, easy-to-operate environments that meet the needs of the users cannot be provided.

SUMMARY OF THE INVENTION

In view of the above problems in the conventional art, the present invention has an object to provide a virtual keyboard system which can be customized in correspondence with the needs of users, and allows flexible data inputs for respective input items.

In one aspect of the present invention, a virtual keyboard system using a virtual keyboard as an input device, includes storage means for storing virtual keyboard management information that describes an association between an input item of a window generated by an application program, and a virtual keyboard used upon data input to the input item; registration means for registering the association between the input item and the virtual keyboard in the virtual keyboard management information in response to a request from the application program; deletion means for deleting the association between the input item and the virtual keyboard from the virtual keyboard management information in response to a request from the application program; selection means for selecting a virtual keyboard associated with the input item based on the virtual keyboard management information upon data input to the input item of the window generated by the application program; and display means for displaying the virtual keyboard selected by the selection means.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a flowchart showing the operation sequence according to the first embodiment of the present invention;

FIG. 7A shows a screen display example to explain the processing operation according to the first embodiment of the present invention;

FIG. 7C shows still another screen display example to explain the processing operation according to the first embodiment of the present invention;

FIGS. 10A and 10B show screen display examples to explain the processing operation according to the second embodiment of the present invention;

FIGS. 14A and 14B show screen display examples to explain the processing operation according to the third embodiment of the present invention.

DESCRIPTION OF THE EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.

First Embodiment

In this embodiment, a virtual keyboard system according to the present invention is applied to a printing system. A description about the operations and functions of a virtual keyboard system, printing system, and printing device, which are already well known, will be omitted accordingly hereinafter.

Figure 1:
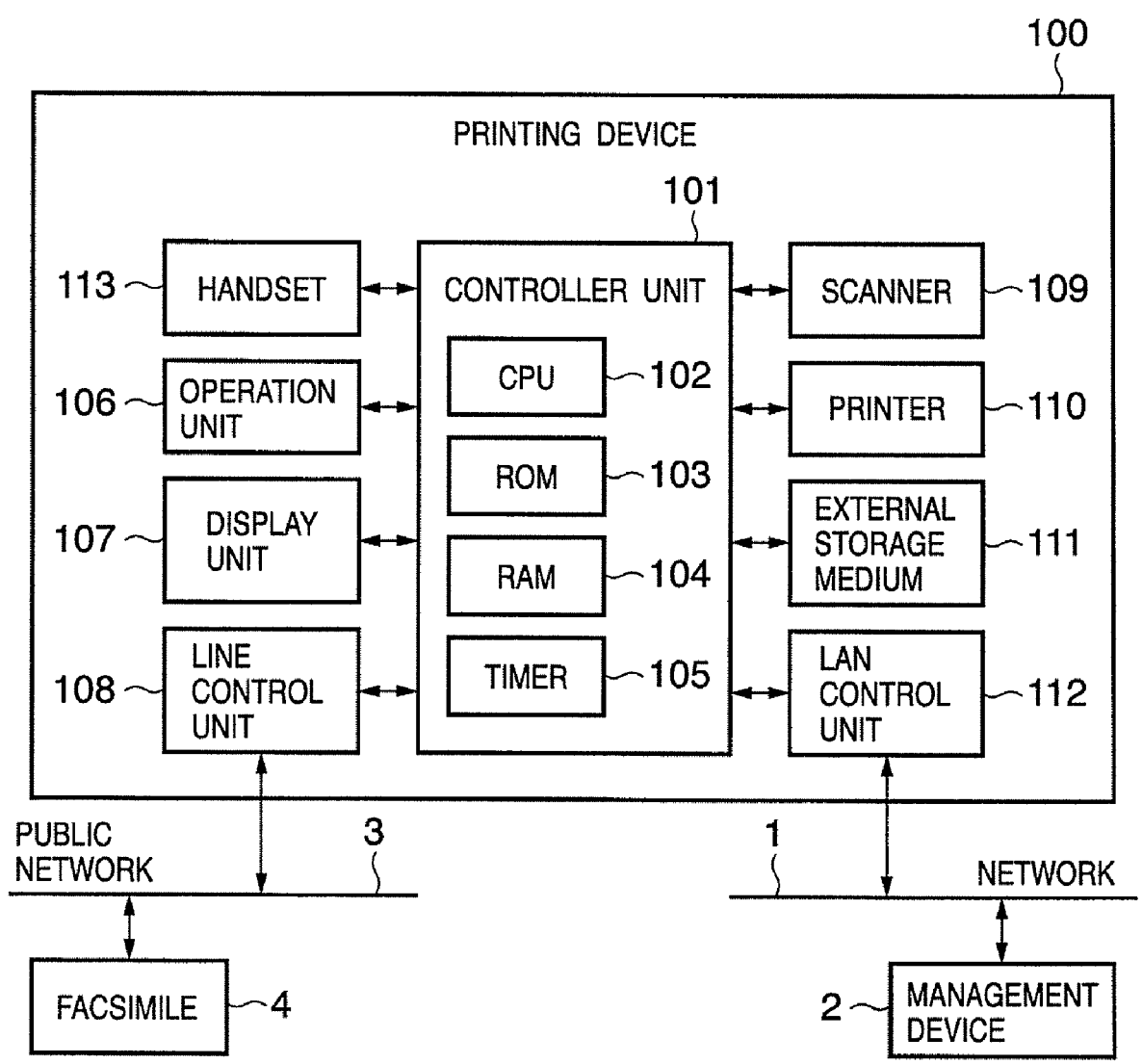
FIG. 1 is a block diagram showing the arrangement of a printing device in a printing system according to the first embodiment of the present invention.

FIG. 1 is a block diagram showing the arrangement of a printing device of a printing system of this embodiment. A printing device 100 is configured as a multi function printing device which comprises a copying function, printing function, scanning function, facsimile communication function, and the like. Furthermore, the printing device 100 is configured as a multi function peripheral equipment which has a function of executing application programs installed in advance, and executing an arbitrary application program installed from a management device 2 when the user requires.

The printing device 100 comprises, as its principal components, a controller unit 101 for controlling the overall printing device, an operation unit 106, a display unit 107, a line control unit 108, a scanner 109, a printer 110, an external storage medium 111, a LAN control unit 112, and a handset 113.

The controller unit 101 comprises a CPU 102, a ROM 103, a RAM 104, a timer 105, and the like. Various programs to be executed by the CPU, data that the programs require, and the like are pre-stored in the ROM 103. Some programs and data can be pre-stored in the external storage medium 111, and can be loaded onto the RAM 104 when they are executed.

The operation unit 106 comprises a numeric keypad 702 used to input a facsimile destination (telephone number) and the like, as shown in an example of FIG. 7A.

The display unit 107 comprises an LCD and touch panel 701. The display unit 107 displays an application program selection menu by means of tab buttons, and the user can selectively use an application program by selecting one of the tab buttons. The application program selection menu is displayed in accordance with active states of application programs installed in the printing system.

Under the application program selection menu, an application window (in case of this example, a window of a facsimile program) is displayed by an application program. This window is used to display a document name, comment, and facsimile destination input guidance, and also various messages such as status of processing, and the like.

Upon pressing the touch panel, the display unit 107 can function as a part of the operation unit 106. When a field of an input item is pressed, a virtual keyboard used to input data is displayed to allow input from the touch panel, as shown in examples of FIGS. 7B and 7C.

The line control unit 108 is used to make a telephone call, and facsimile transmission and reception via a telephone line.

More specifically, the line control unit 108 comprises an encoder/decoder which encodes an image scanned by the scanner 109 to a data format for facsimile transmission, and decodes received data, a modem, and an NCU, and communicates with a facsimile device 4 via a public network 3.

The scanner 109 is used to read documents upon executing copying or facsimile transmission.

The printer 110 is used to print out an image scanned by the scanner 109 by the copying function, and to print out facsimile received data.

The external storage medium 111 is used to store application programs, and to also save images scanned by the scanner 109.

The LAN control unit 112 is used to communicate with another facsimile device via an intra-network 1, and to also communicate with the management device 2.

The handset 113 is used to make a telephone call via the telephone line.

Figure 2:
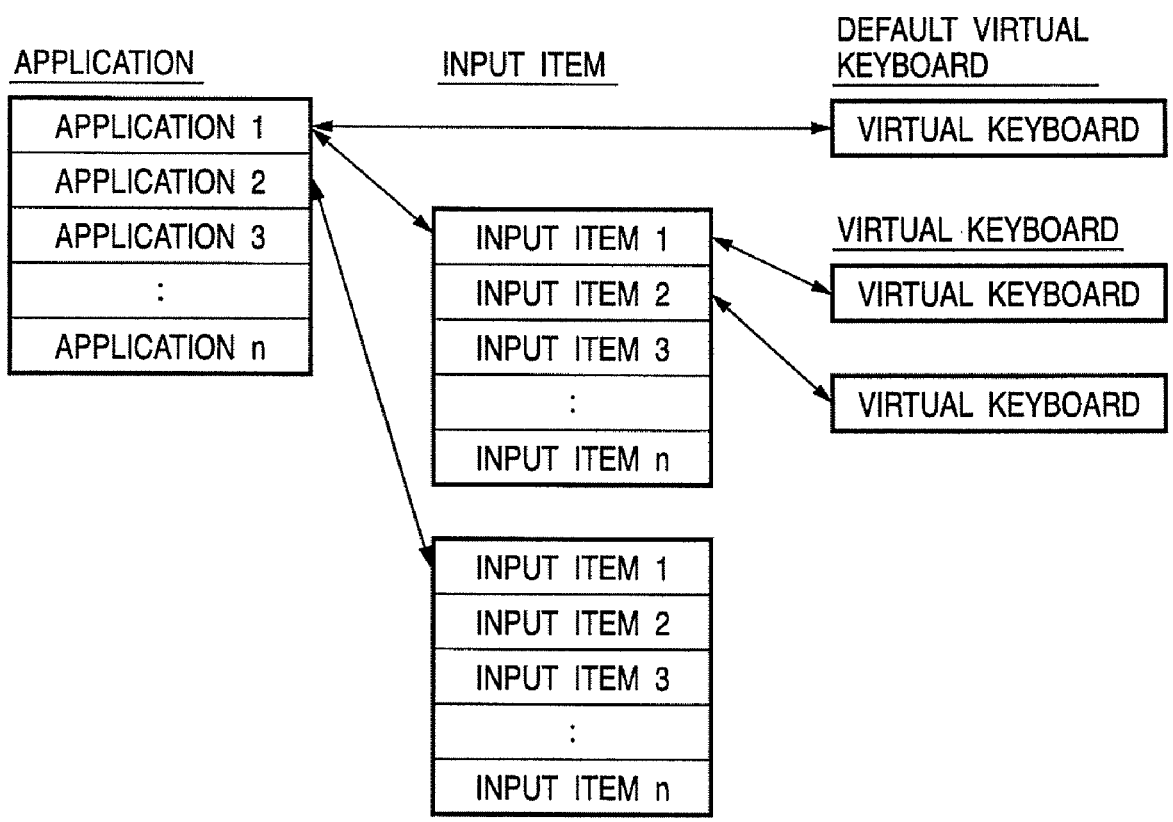
FIG. 2 is a block diagram showing the configuration of virtual keyboard management information according to the first embodiment of the present invention.

In this embodiment, upon launching an application program, the association between virtual keyboards used to input data to input items on an application window and the input items is registered as virtual keyboard management information shown in FIG. 2 in a virtual keyboard manager. Upon pressing a field of the corresponding input item, the virtual keyboard manager displays a virtual keyboard associated with that input item, and accepts data input by the user.

FIG. 2 shows a configuration example of the virtual keyboard management information. The virtual keyboard management information holds information of virtual keyboards associated with respective input items of application programs in correspondence with the application programs.

The operation associated with the present invention of the printing system with the above arrangement will be described below using the flowcharts of FIGS. 4, 5, and 6. These flowcharts explain the processing of virtual keyboards in the printing system.

Figure 5:
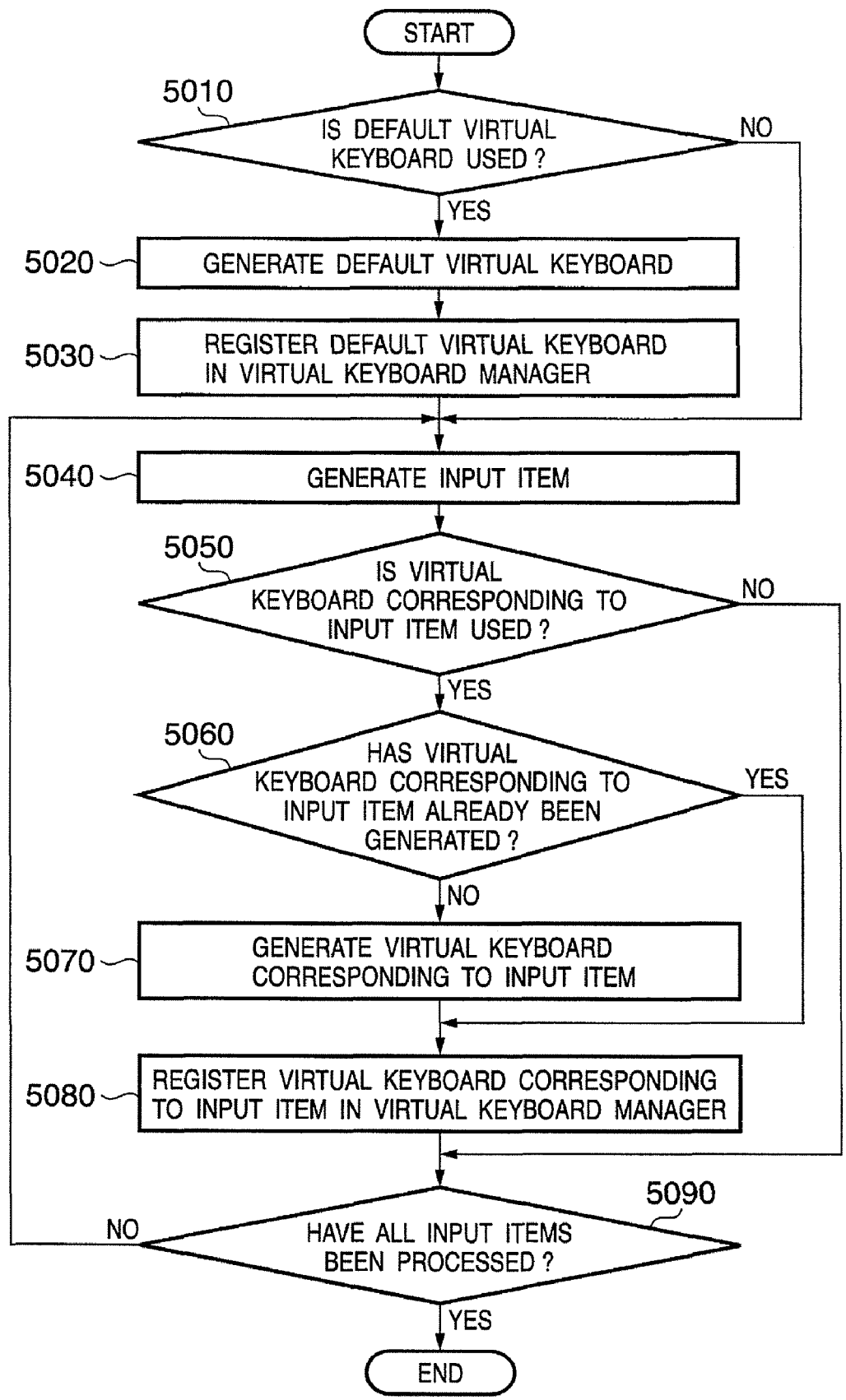
FIG. 5 is a flowchart showing the operation sequence according to the first embodiment of the present invention.

In the printing device 100, if an application program is launched, it is checked in step 5010 in FIG. 5 if a default virtual keyboard is used. The default virtual keyboard is the one which is prepared in advance and is used when no virtual keyboard is registered for a given input item. If it is determined in step 5010 that the default virtual keyboard is used, a virtual keyboard is generated in step 5020, and is registered in the virtual keyboard manager in step 5030. If no virtual keyboard is registered in these steps, a default virtual keyboard prepared by the system is used in the subsequent processing. If generation and acquisition of the default virtual keyboard have failed, a default virtual keyboard prepared by the system is also used.

Next, in step 5040 an input item to be displayed on the application window is generated. It is checked in step 5050 if a virtual keyboard corresponding to that input item is used. If it is determined that the virtual keyboard corresponding to that input item is used, it is checked in step 5060 if a desired virtual keyboard has already been generated. If such virtual keyboard has not been generated yet, a virtual keyboard corresponding to the input item is generated in step 5070, and is registered as virtual keyboard management information in the virtual keyboard manager in association with the input item in step 5080. It is checked in step 5090 if all input items on the application window have been processed. If input items to be processed still remain, the processing is repeated from step 5040.

Figure 7B:
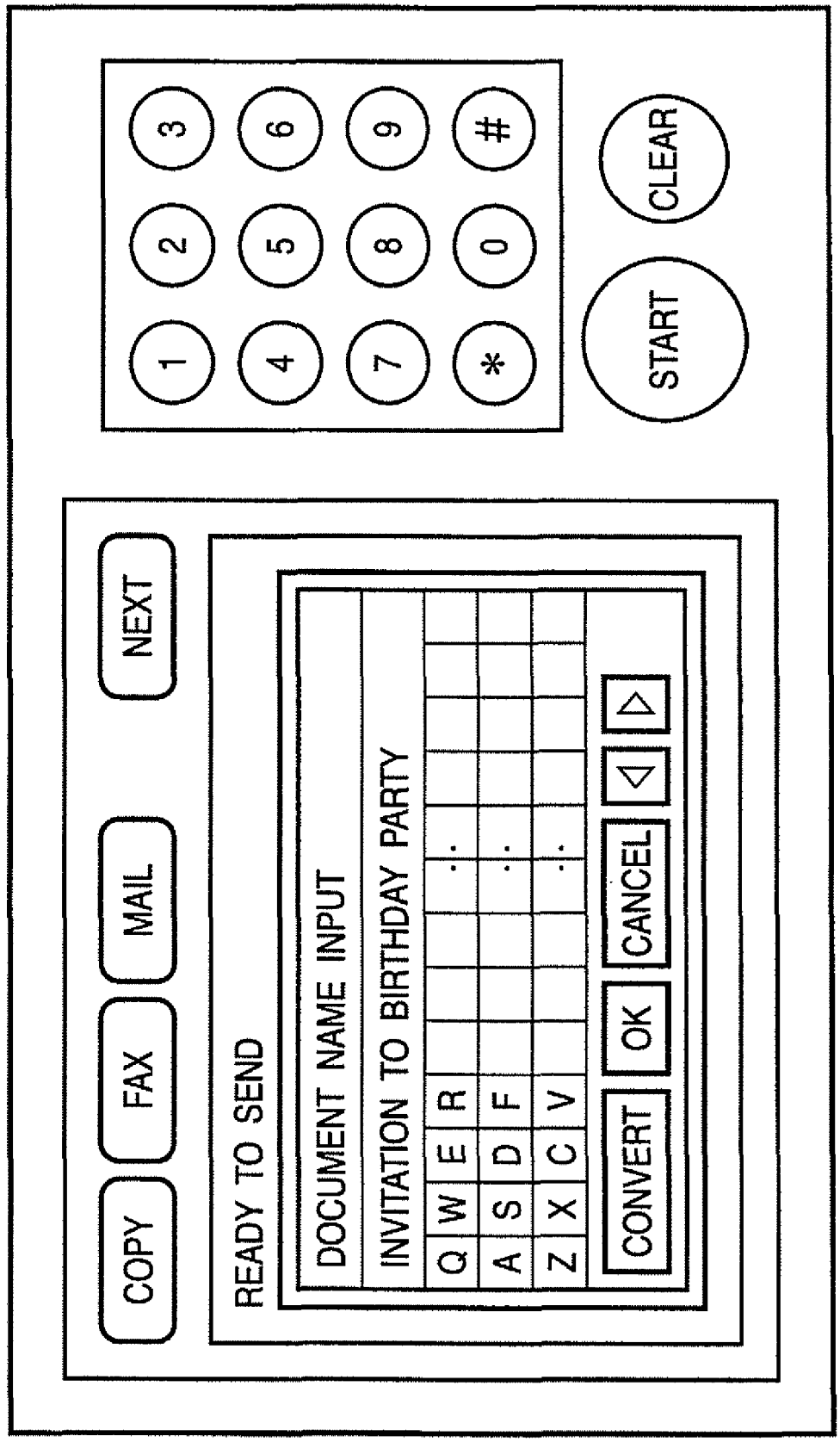
FIG. 7B shows another screen display example to explain the processing operation according to the first embodiment of the present invention.

In this embodiment, a "text input virtual keyboard" is associated with the input items "document name" and "comment" shown in FIG. 7A as a display window of the facsimile program, and a "destination input virtual keyboard" is associated with the input item of "destination". These are respectively virtual keyboards shown in FIGS. 7B and 7C. The "destination input virtual keyboard" is the one specialized to destination input, and is used for the input item "destination" in this embodiment.

Furthermore, when the input item and virtual keyboard are registered in association with each other, properties used upon displaying the virtual keyboard can be set. The properties include designation of the location of an address book for the destination input virtual keyboard, designation of a font upon displaying the virtual keyboard, a title of the virtual keyboard, and the like.

Figure 4:
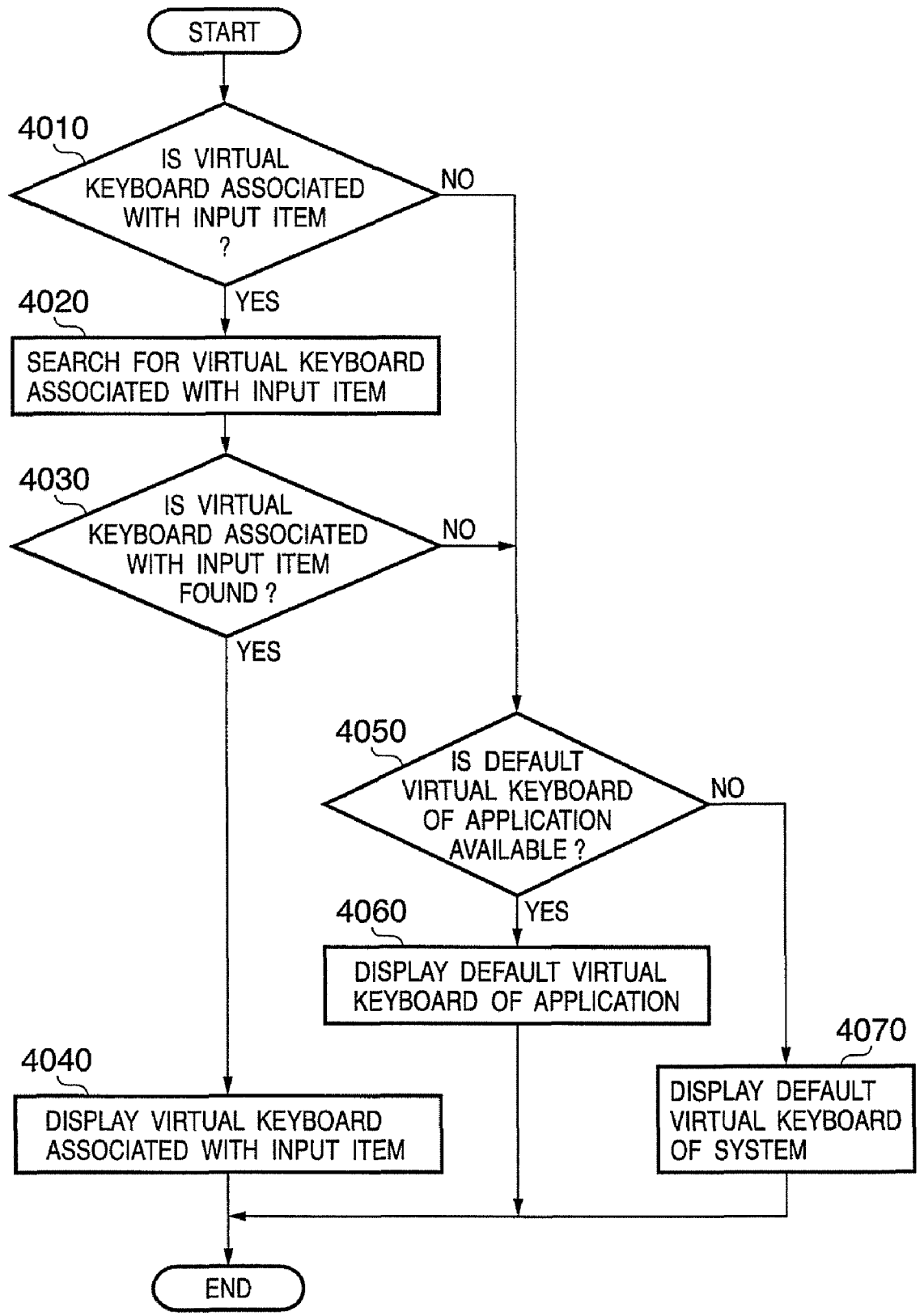
FIG. 4 is a flowchart showing the operation sequence according to the first embodiment of the present invention.

When the application window is displayed and the user makes data input, the following processing is executed according to the flowchart of FIG. 4. When the user presses an input field corresponding to a given input item on the application window, a virtual keyboard associated with that input item is displayed in the following sequence. It is checked in step 4010 if a virtual keyboard is associated with the input item. If no virtual keyboard is associated, it is checked in step 4050 if a default virtual keyboard of the application is available. If the default virtual keyboard of the application is available, the default virtual keyboard of the application is displayed in step 4060. If no default virtual keyboard of the application is available, the default virtual keyboard of the system is displayed in step 4070. If it is determined in step 4010 that the virtual keyboard is associated, the virtual keyboard associated with the input item is searched for based on the virtual keyboard management information in FIG. 2 in step 4020. If the associated virtual keyboard is found, the virtual keyboard associated with the input item is displayed in step 4040. If no associated keyboard is found, the default virtual keyboard is displayed in the sequence from step 4050.

In this embodiment, the "text input virtual keyboard" is associated with the input items "document name" and "comment" in FIG. 7A, and the "destination input virtual keyboard" is associated with the input item "destination". For this reason, the virtual keyboards suited to the input items are displayed, as shown in FIGS. 7B and 7C.

When the application program is to end, the following processing is done according to the flowchart of FIG. 6.

It is checked in step 6010 if the default virtual keyboard was used. If the default virtual keyboard was used, its registration is canceled from the virtual keyboard manager in step 6020 and the default virtual keyboard is deleted in step 6030. It is checked in step 6040 if the virtual keyboard associated with the input item was used. If the virtual keyboard associated with the input item was used, its registration is canceled from the virtual keyboard manager in step 6050, and it is checked in step 6060 if the virtual keyboard has already been deleted. If the virtual keyboard has not been deleted yet, the virtual keyboard is deleted in step 6070. In step 6080, the input item generated upon launching is deleted. It is then checked in step 6090 if all the input items have been processed. If the input items to be processed still remain, the processing is repeated from step 6040.

As described above, in the virtual keyboard system of this embodiment, the virtual keyboards corresponding to the input items on the application window are registered. When a field of a given input item is pressed, the virtual keyboard associated with that input item is displayed to accept data input by the user. With this arrangement, since the virtual keyboards suited to the input items are provided to the user, user's operability can be improved.

Second Embodiment

The second preferred embodiment according to the present invention will be described in detail hereinafter using the accompanying drawings. Since the block diagram of the printing system of the second embodiment is the same as that in the first embodiment, a description thereof will be omitted.

In the second embodiment, virtual keyboards generated by a given application program can be used from another application program, in addition to the first embodiment. For example, the association with a second application program which is permitted to use virtual keyboards generated by a first application program is registered in the virtual keyboard manager as public virtual keyboard information shown in FIG. 3. When the second application uses the virtual keyboards, it acquires and uses available virtual keyboards (public virtual keyboards) from the public virtual keyboard information.

Figure 3:
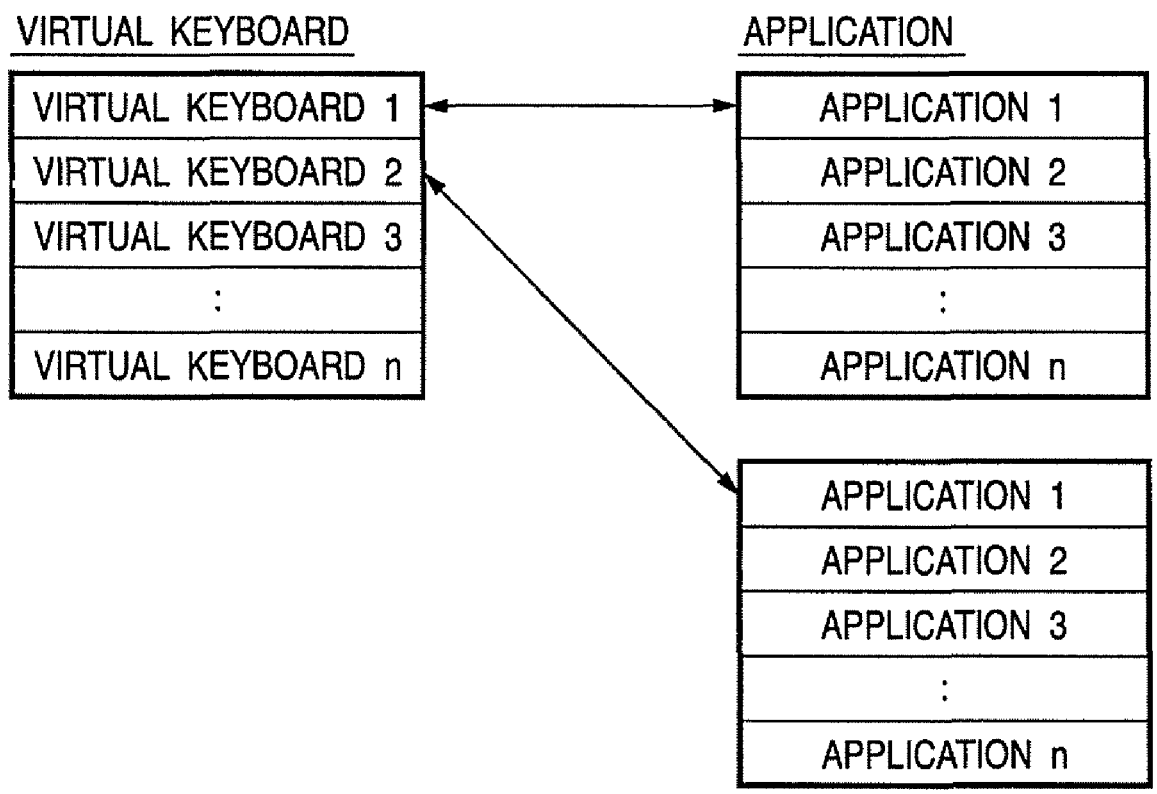
FIG. 3 is a block diagram showing the configuration of public virtual keyboard information according to the first embodiment of the present invention.

FIG. 3 shows the configuration of the public virtual keyboard information, which holds information of application programs which are permitted to use for respective virtual keyboards which are published to other applications.

Figure 8:
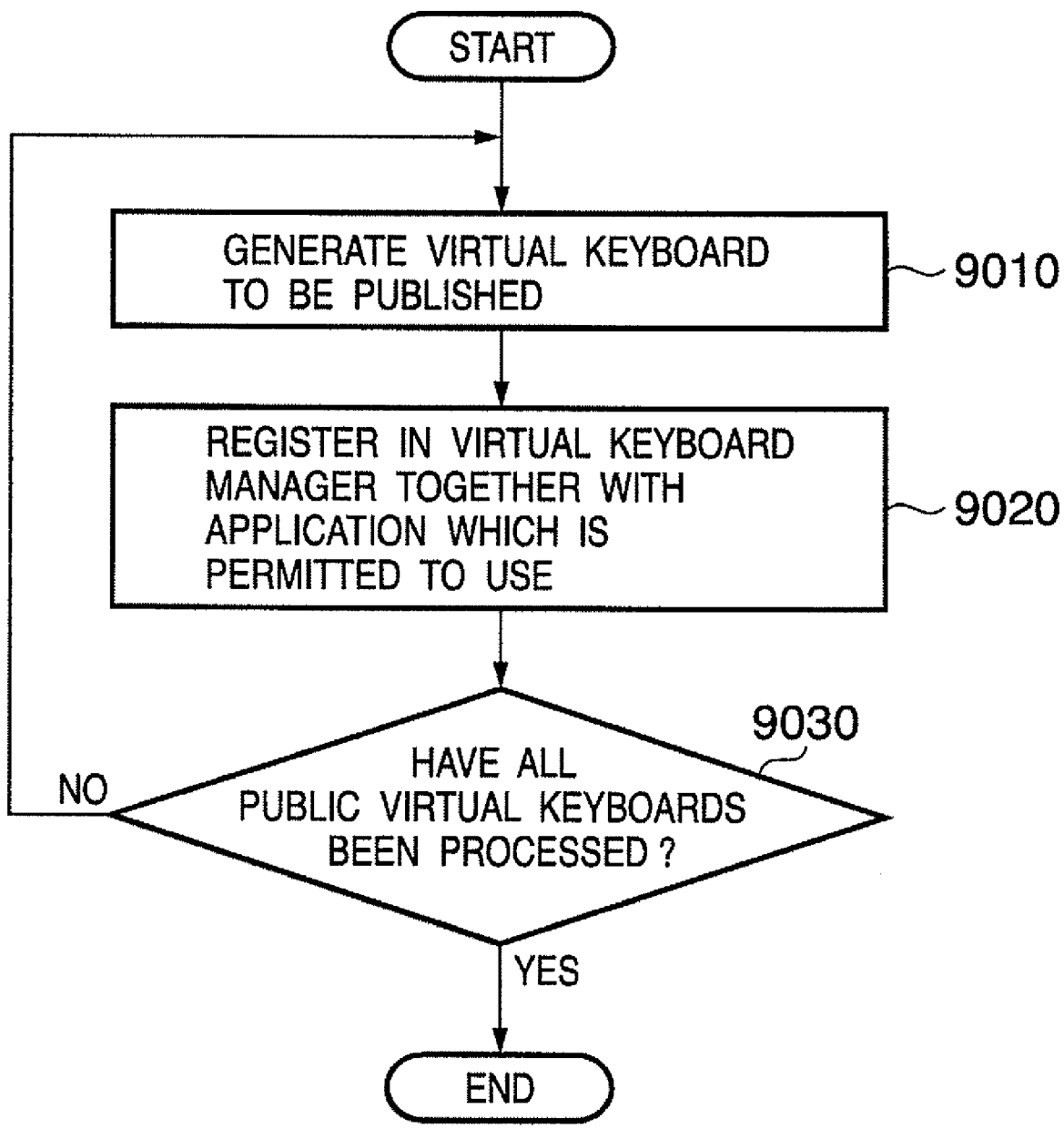
FIG. 8 is a flowchart showing the operation sequence according to the second embodiment of the present invention.
Figure 9:
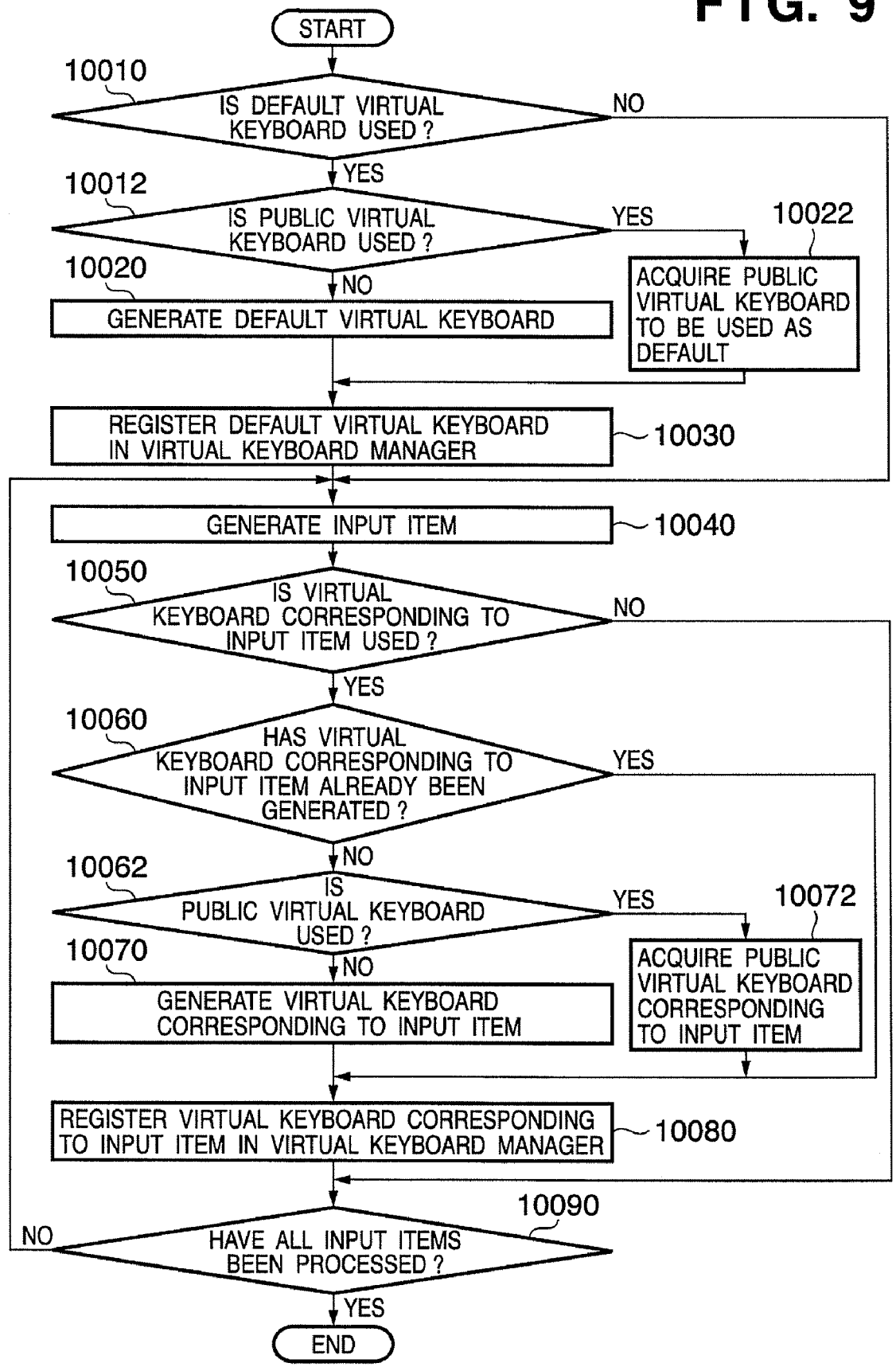
FIG. 9 is a flowchart showing the operation sequence according to the second embodiment of the present invention.

The operation associated with the present invention of the printing system with the above arrangement will be described below using the flowcharts of FIGS. 8 and 9. The outline of the processing sequence is the same as that in the first embodiment, and only differences will be explained below.

In the printing device 100, when an application program which publishes virtual keyboards to other application programs is launched, a virtual keyboard to be published is generated in step 9010 in FIG. 10. In step 9020, the generated virtual keyboard is registered in the virtual keyboard manager as the public virtual keyboard information shown in FIG. 3 together with information of application programs which are permitted to use that virtual keyboard. It is then checked in step 9030 if all virtual keyboards to be published have been processed. If virtual keyboards to be processed still remain, the processing is repeated from step 9010.

In this embodiment, the facsimile program registers, as public virtual keyboards, a "text input virtual keyboard" mainly used to input characters for a document name, comment, and the like, and a "destination input virtual keyboard" specialized to input a destination based on the address book.

On the other hand, a case will be examined wherein an application program (e.g., a mail program in FIG. 10A) which uses virtual keyboards generated by another application program is launched. In this case, it is checked in step 10010 in FIG. 9 if a default virtual keyboard is used. If it is determined in step 10010 that the default virtual keyboard is used, it is checked in step 10012 if a public virtual keyboard is used. If the public virtual keyboard is used, a public virtual keyboard to be used as a default is acquired in step 10022. If no public virtual keyboard is used, a default virtual keyboard is generated in step 10020. In step 10030, the generated keyboard is registered as a default virtual keyboard in the virtual keyboard manager. If no default virtual keyboard is registered in these steps, a default virtual keyboard prepared by the system is used in the subsequent processing. If generation and acquisition of the default virtual keyboard have failed, a default virtual keyboard prepared by the system is also used.

In step 10040, an input item to be displayed on the application window is generated. It is checked in step 10050 if a virtual keyboard corresponding to that input item is used. If it is determined that the virtual keyboard corresponding to that input item is used, it is checked in step 10060 if a desired virtual keyboard has already been generated. If such virtual keyboard has not been generated yet, it is checked in step 10062 if a public virtual keyboard is used. If the public virtual keyboard is used, the public virtual keyboard corresponding to the input item is acquired in step 10072. If no public virtual keyboard is used, a virtual keyboard corresponding to the input item is generated in step 10070. After that, in step 10080 the virtual keyboard corresponding to the input item is registered in the virtual keyboard manager. It is checked in step 10090 if all input items on the application window have been processed. If input items to be processed still remain, the processing is repeated from step 10040.

Figure 10A:
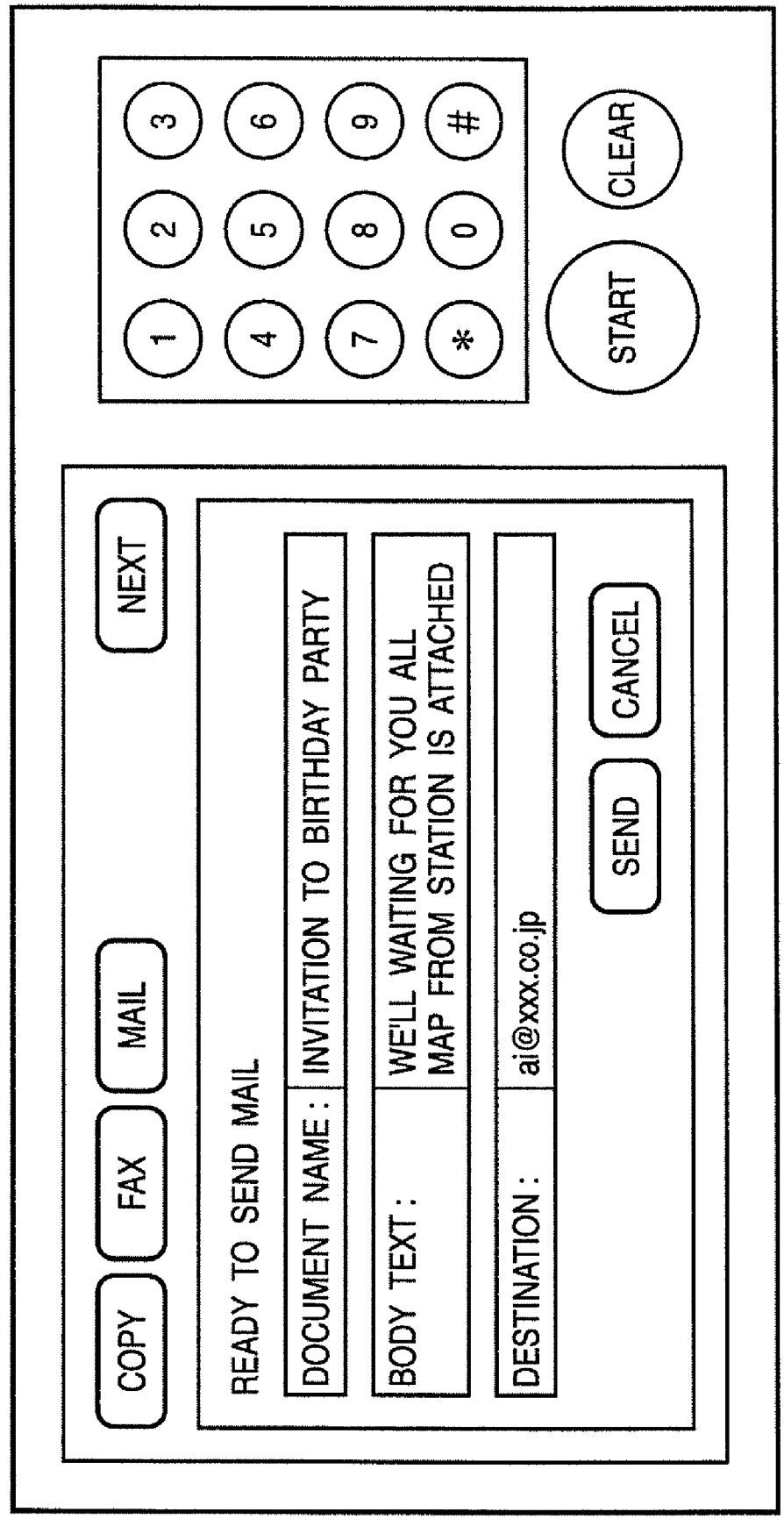

In this embodiment, a "text input virtual keyboard" is associated with input items "document name" and "body text" in FIG. 10A as a display window of the mail program. Also, a "destination input virtual keyboard" is assigned to an input item "destination". These are respectively virtual keyboards shown in FIGS. 7B and 7C showing the display windows of facsimile programs. When the application window is displayed and the user makes data input, the virtual keyboards associated with the input items are displayed according to the flowchart of FIG. 4 described in the first embodiment. In this embodiment, for the input items "document name" and "body text" in FIG. 10A, the "text input virtual keyboard" is displayed as that suited to these input items using the public virtual keyboard (the virtual keyboard generated by the facsimile program). Also, for the input item "destination", the "destination input virtual keyboard" is displayed as that suited to the input item using the public virtual keyboard. FIG. 10B shows a display example of the "destination input virtual keyboard".

As described above, in the virtual keyboard system according to this embodiment, when the application program generates virtual keyboards, other applications which are permitted to use these virtual keyboards are registered. In this way, a plurality of applications can share virtual keyboards, and operability among these applications can be unified, thus improving the productivity of the application programs.

Third Embodiment

The third preferred embodiment according to the present invention will be described in detail hereinafter using the accompanying drawings. Since the block diagram of the printing system of the third embodiment is the same as that in the first embodiment, a description thereof will be omitted.

In the third embodiment, a plurality of virtual keyboards can be registered in association with one input item. Upon launching an application, a plurality of virtual keyboards are associated with an input item on an application window. Such association is registered in the virtual keyboard manager as virtual keyboard management information shown in FIG. 15. When a field of a given input item is pressed, the virtual keyboard manager displays a plurality of virtual keyboards associated with that input item to accept data input by the user.

Figure 15:
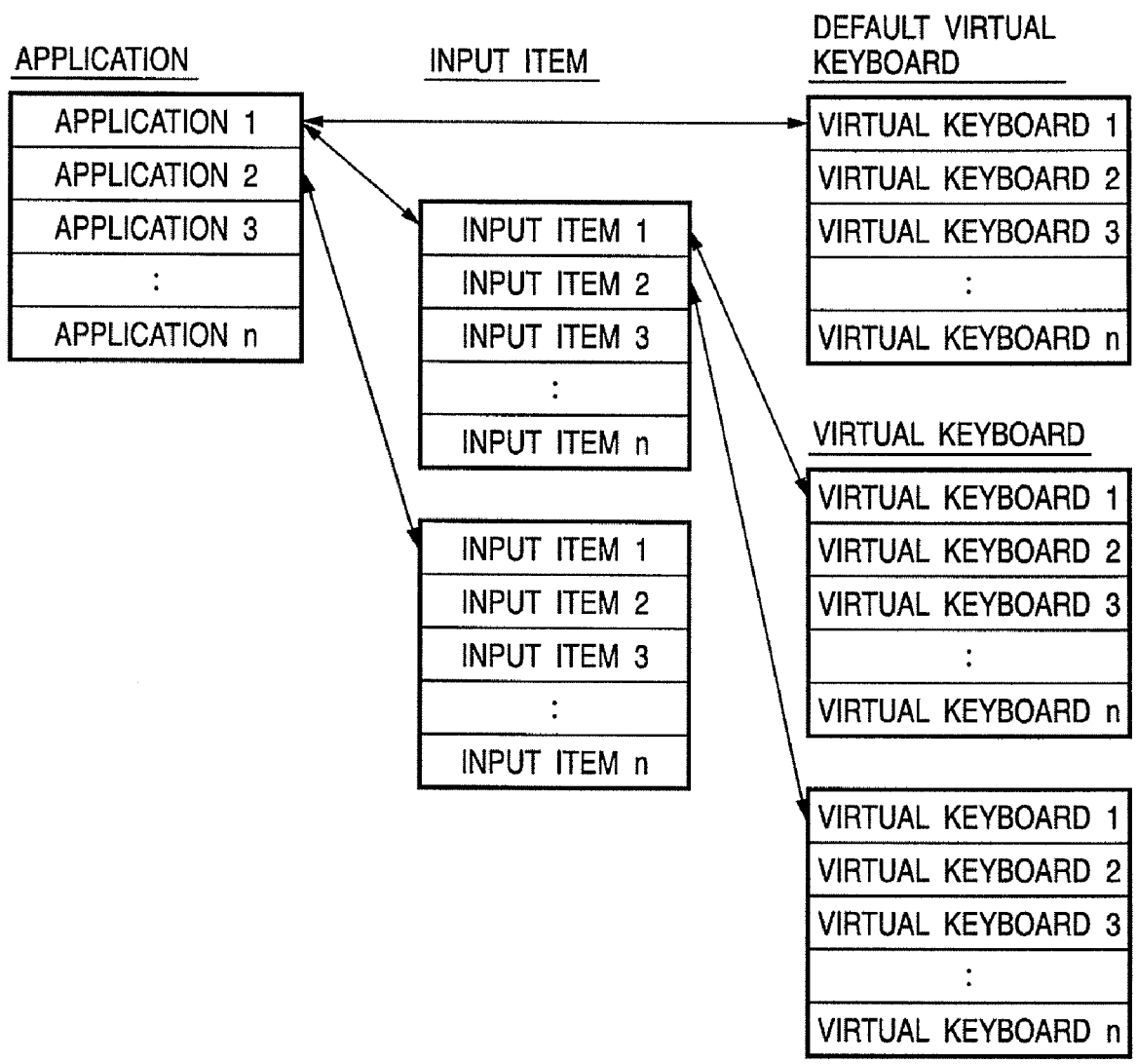
FIG. 15 is a block diagram showing the configuration of virtual keyboard management information according to the third embodiment of the present invention.

FIG. 15 shows the configuration of virtual keyboard management information, which holds information of a plurality of virtual keyboards associated with each input item for respective applications.

The operation associated with the present invention of the printing system with the above arrangement will be described below using the flowcharts of FIGS. 11, 12, and 13. The outline of the processing sequence is the same as that in the first embodiment, and only differences will be explained below. Note that FIG. 14A that shows an example of an operation panel has a configuration having no numeric keypad 702 in FIG. 7A unlike the operation panel of the first embodiment. On such operation panel, a numeric keypad must also be implemented as a virtual keyboard.

Figure 12:
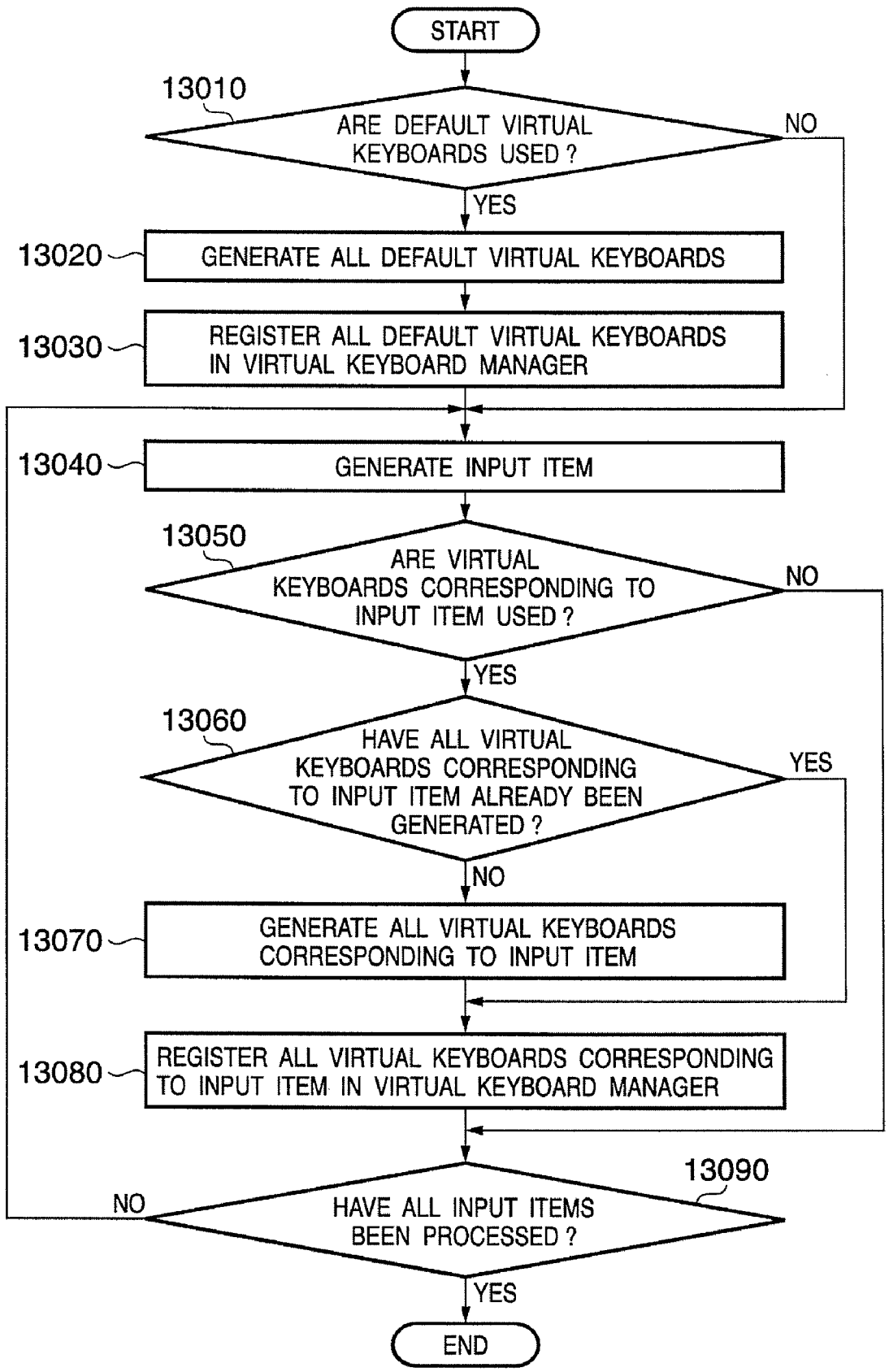
FIG. 12 is a flowchart showing the operation sequence according to the third embodiment of the present invention.

In the printing device 100, if an application program is launched, it is checked in step 13010 in FIG. 12 if default virtual keyboards are used. If it is determined in step 13010 that the default virtual keyboards are used, all default virtual keyboards are generated in step 13020, and are registered in the virtual keyboard manager in step 13030. If no virtual keyboards are registered in these steps, default virtual keyboards prepared by the system are used in the subsequent processing. If generation and acquisition of the default virtual keyboards have failed, default virtual keyboards prepared by the system are also used.

Next, in step 13040 an input item to be displayed on the application window is generated. It is checked in step 13050 if virtual keyboards corresponding to that input item are used. If it is determined that the virtual keyboards corresponding to that input item are used, it is checked in step 13060 if all desired virtual keyboards have already been generated. If such virtual keyboards have not been generated yet, all virtual keyboard corresponding to the input item are generated in step 13070, and are registered as virtual keyboard management information shown in FIG. 15 in the virtual keyboard manager in association with the input item in step 13080. It is checked in step 13090 if all input items on the application window have been processed. If input items to be processed still remain, the processing is repeated from step 13040.

Figure 14B:
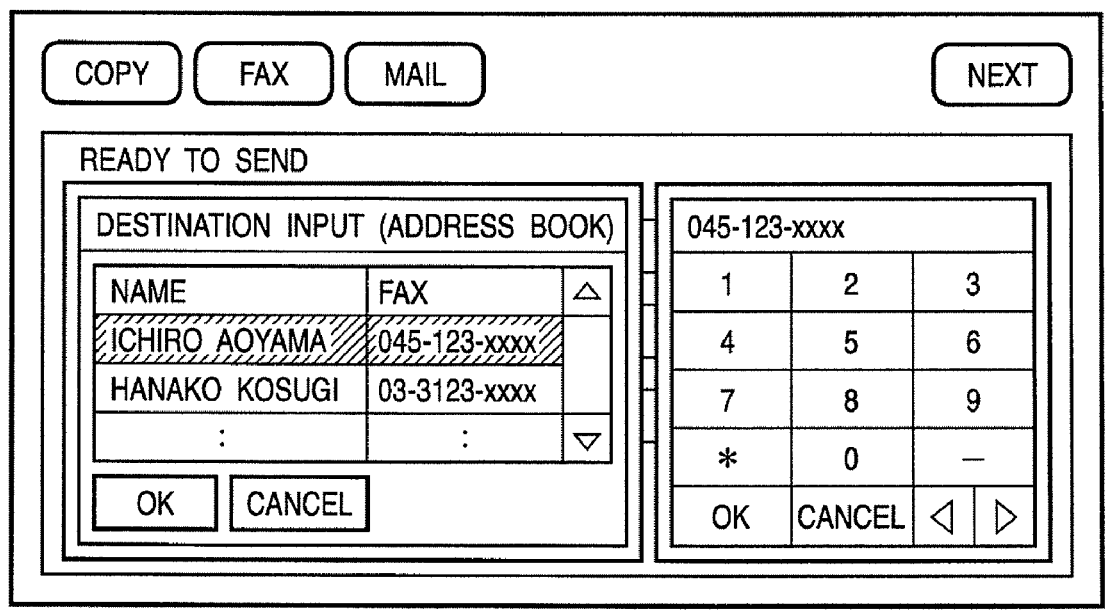

In this embodiment, a "text input virtual keyboard" is associated with the input items "document name" and "comment" shown in FIG. 14A as a display window of the facsimile program. Also, a "destination input virtual keyboard" and "numeric input virtual keyboard" are associated with the input item of "destination". Since the operation panel of this embodiment in FIG. 14A has no numeric keypad on the operation unit, the "numeric input virtual keyboard" is also used as its alternative. The "text input virtual keyboard" and "destination input keyboard" are the same as those in the first and second embodiments. The "numeric input virtual keyboard" is that shown in FIG. 14B.

Figure 11:
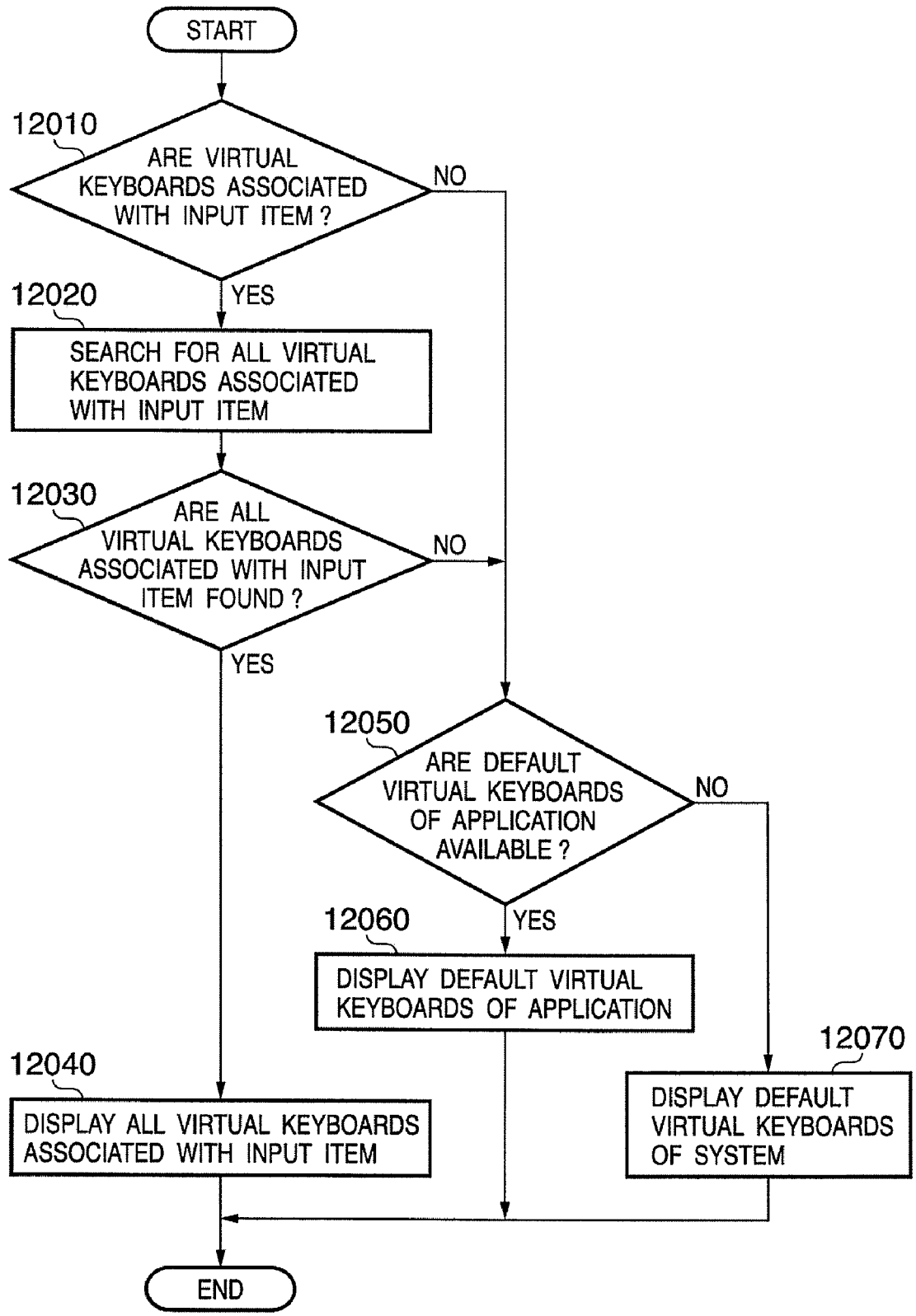
FIG. 11 is a flowchart showing the operation sequence according to the third embodiment of the present invention.

When the application window is displayed and the user makes data input, the following processing is executed according to the flowchart of FIG. 11. When the user presses an input field corresponding to a given input item on the application window, a virtual keyboard or keyboards associated with that input item is or are displayed in the following sequence. It is checked in step 12010 if a virtual keyboard or keyboards is or are associated with the input item. If no virtual keyboard or virtual keyboards is or are associated, it is checked in step 12050 if a default virtual keyboard or keyboards of the application is or are available. If the default virtual keyboard or keyboards of the application is or are available, the default virtual keyboard or keyboards of the application is or are displayed in step 12060. If no default virtual keyboard or keyboards of the application is or are available, the default virtual keyboard or keyboards of the system is or are displayed in step 12070. If it is determined in step 12010 that the virtual keyboard or keyboards is or are associated, the virtual keyboard or keyboards associated with the input item is or are searched for based on the virtual keyboard management information in FIG. 15 in step 12020. If the associated virtual keyboard or keyboards is or are found, the virtual keyboard or keyboards associated with the input item is or are displayed in step 12040. If no associated keyboard or keyboards is or are found, the default virtual keyboard or keyboards is or area displayed in the sequence from step 12050.

In this embodiment, the "text input virtual keyboard" is associated with the input items "document name" and "comment" in FIG. 14A. The "destination input virtual keyboard" and "numeric input virtual keyboard" are associated with the input item "destination". FIG. 14B shows a display example of the "destination input virtual keyboard" and "numeric input virtual keyboard". The user inputs a destination by selecting a displayed address book, or if no address book is available, he or she inputs a number using the numeric keypad.

Figure 13:
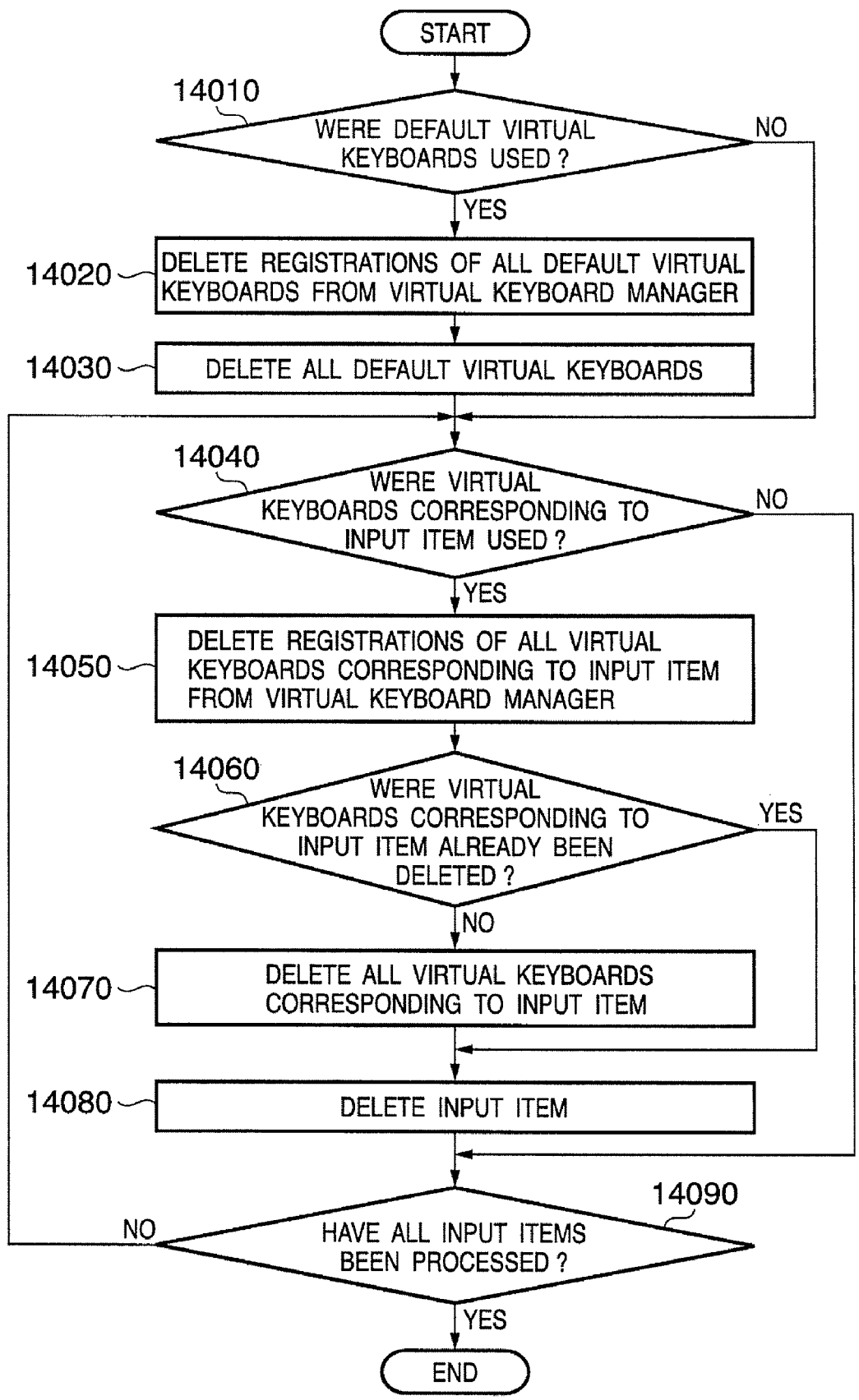
FIG. 13 is a flowchart showing the operation sequence according to the third embodiment of the present invention.

When the application program is to end, the following processing is done according to the flowchart of FIG. 13.

It is checked in step 14010 if the default virtual keyboards were used. If the default virtual keyboards were used, all their registrations are canceled from the virtual keyboard manager in step 14020 and all the default virtual keyboards are deleted in step 14030. It is checked in step 14040 if the virtual keyboards associated with the input item were used. If the virtual keyboards associated with the input item were used, all their registrations are canceled from the virtual keyboard manager in step 14050, and it is checked in step 14060 if the virtual keyboards have already been deleted. If the virtual keyboards have not been deleted yet, all the virtual keyboards are deleted in step 14070. In step 14080, the input item generated upon launching is deleted. It is then checked in step 14090 if all the input items have been processed. If the input items to be processed still remain, the processing is repeated from step 14040.

As described above, in the virtual keyboard system according to this embodiment, a plurality of virtual keyboards are associated with one input item. When a field of a given input item is pressed, the plurality of associated virtual keyboards are displayed to accept data input by the user. In this manner, a combination of various virtual keyboards can be provided to the user, thus further improving user's operability.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-203534 filed on Jul. 12, 2005, which is hereby incorporated by reference herein in its entirety.

What is claimed is:

1. A virtual keyboard system using a virtual keyboard as an input device, comprising:
   storage means for storing virtual keyboard management information that describes respective associations between each of a plurality of input fields, and a respective virtual keyboard used upon data input to that input field;
   registration means for registering the association between the input field and the virtual keyboard in the virtual keyboard management information in response to a request from an application program that uses data input in the input field;
   selection means for selecting, in response to designation of one of the plurality of input fields on a window generated by an application program, a virtual keyboard associated with that one of the plurality of input fields on the window based on the virtual keyboard management information; and
   display means, responsive to selection by said selection means, for displaying the virtual keyboard selected by said selection means for inputting data to the one of the plurality of input fields on the window.

2. The system according to claim 1, wherein, when no virtual keyboard associated with the one of the plurality of input fields is available, said selection means selects a default virtual keyboard.

3. The system according to claim 2, wherein the default virtual keyboard is a specific virtual keyboard prepared in advance by said virtual keyboard system.

4. The system according to claim 2, wherein the default virtual keyboard is a specific virtual keyboard prepared in advance by the application.

5. The system according to claim 1, wherein the virtual keyboard management information includes display attribute information of a virtual keyboard, and said display means displays the virtual keyboard selected by said selection means based on the display attribute information.

6. The system according to claim 1, wherein the virtual keyboard management information can associate, with one input field, a plurality of virtual keyboards used upon data input to that input field, said selection means selects a plurality of virtual keyboards associated with the input field based on the virtual keyboard management information responsive to designation of to the input field of the window generated by the application program, and said display means displays the plurality of virtual keyboards selected by said selection means.

7. A virtual keyboard system using a virtual keyboard as an input device, comprising:

storage means for storing public virtual keyboard information that describes associations between a virtual keyboard generated by a first application program, and each of a plurality of input fields on a window generated by a second application program which is permitted to use the virtual keyboard, wherein the second application program accepts input in each of the plurality of fields, and wherein the plurality of input fields differ from each other;

registration means for registering the association between the virtual keyboard and the second application program in the public virtual keyboard information in response to a request from the first application program; and acquisition means for acquiring, responsive to designation of one of the plurality of input fields on the window generated by the second application program for input to that one of the input fields, a respective virtual keyboard associated with that one of the input fields based on the public virtual keyboard information in response to a request from the second application program.

8. A method for controlling a virtual keyboard system using a virtual keyboard as an input device and having a storage means, the method comprising:

a display step of displaying a window generated by an application program, the application program accepting data input via a plurality of input fields that differ from each other;

a storage step of storing, in the storage means, the virtual keyboard management information that describes associations between each of the input fields on the window generated by the application program, and a respective virtual keyboard used upon data input into that input field;

a registration step of registering the association between an input field and the virtual keyboard in the virtual keyboard management information in response to a request from the application program that uses data input in the input field; and a selecting step of selecting, responsive to designation of one of the plurality of input fields on the window generated by the application program for data input to that one of the input fields, a virtual keyboard associated with that one of the plurality of input fields on the window based on the virtual keyboard management information, wherein the display step includes displaying, responsive to selection in the selecting step, the virtual keyboard selected in the selecting step.

9. The method according to claim 8, wherein, in the selecting step, when no virtual keyboard associated with the one of the plurality of input fields is available, a default virtual keyboard is selected.

10. The method according to claim 9, wherein the default virtual keyboard is a specific virtual keyboard prepared in advance by the virtual keyboard system.

11. The method according to claim 9, wherein the default virtual keyboard is a specific virtual keyboard prepared in advance by the application.

12. The method according to claim 8, wherein the virtual keyboard management information includes display attribute information of a virtual keyboard, and in the display step, the virtual keyboard selected in the selecting step is displayed based on the display attribute information.

13. The method according to claim 8, wherein the virtual keyboard management information can associate, with one input field, a plurality of virtual keyboards used upon data input to that input field, in the selecting step, a plurality of virtual keyboards associated with the input field is selected based on the virtual keyboard management information upon data input to the input field of the window generated by the application program, and in the display step, the plurality of virtual keyboards selected in the selecting step are displayed.

14. A method of controlling a virtual keyboard system using a virtual keyboard as an input device and having a storage means, the method comprising:

a storage step, of storing, in the storage means, public virtual keyboard information that describes associations between a virtual keyboard generated by a first application program, and each of a plurality of input fields on a window generated by a second application program which is permitted to use the virtual keyboard, wherein the second application program accepts input into each of the plurality of fields, and wherein the plurality of input fields differ from each other;

a registration step of registering the association between the virtual keyboard and the second application program in the public virtual keyboard information in response to a request from the first application program; and an acquisition step of acquiring, responsive to designation of one of the plurality of input fields on the window generated by the second application program for data input to the one of the input fields, a virtual keyboard associated with that one of the plurality of input fields based on the public virtual keyboard information in response to a request from the second application program.

* * * * *